E. F. KELLEY.
EQUALIZING DEVICE FOR TRAILER BRAKES.
APPLICATION FILED DEC. 9, 1919.
1,341,617. Patented May 25, 1920.
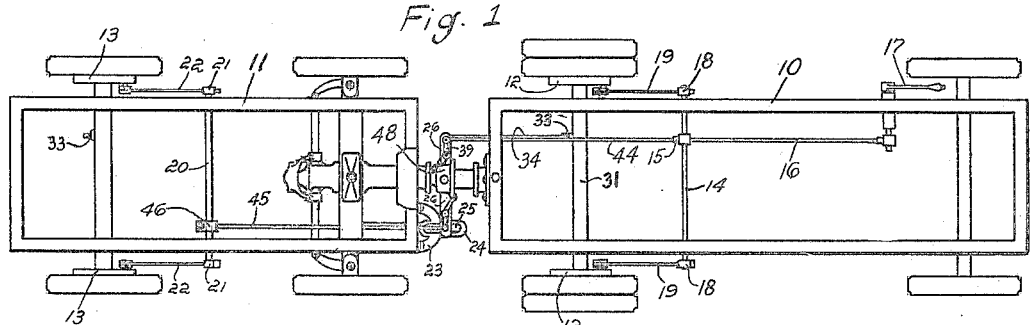
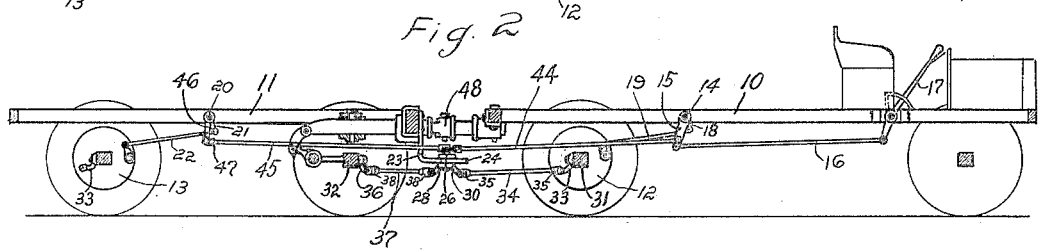
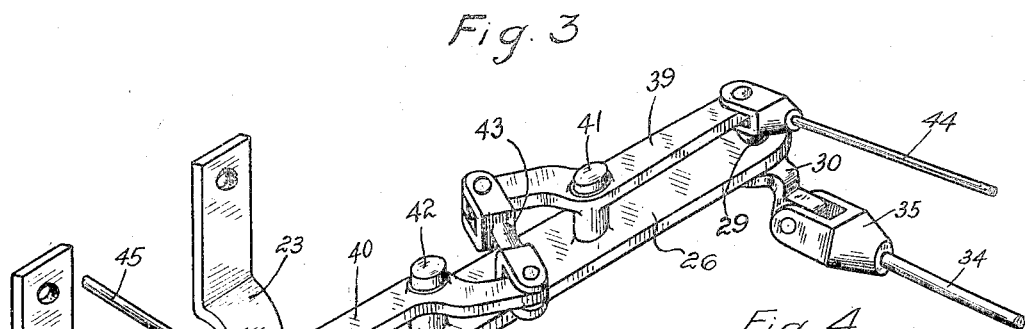
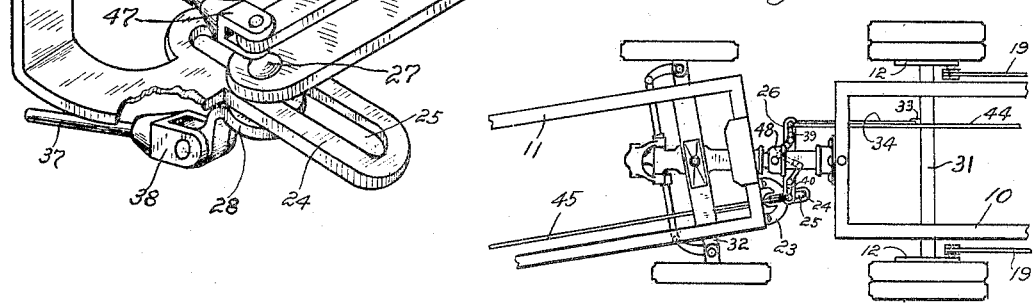
INVENTOR
Edward F. Kelley
BY
A. M. Booster
ATTORNEY

UNITED STATES PATENT OFFICE.

EDWARD F. KELLEY, OF STRATFORD, CONNECTICUT, ASSIGNOR TO THE RAYBESTOS COMPANY OF BRIDGEPORT, CONNECTICUT, A CORPORATION OF CONNECTICUT.

EQUALIZING DEVICE FOR TRAILER-BRAKES.

1,341,617.          Specification of Letters Patent.      Patented May 25, 1920.

Application filed December 9, 1919. Serial No. 343,492.

*To all whom it may concern:*

Be it known that I, EDWARD F. KELLEY, a citizen of the United States, residing at 1598 Main St., Stratford, county of Fairfield, State of Connecticut, have invented an Improvement in Equalizing Devices for Trailer-Brakes, of which the following is a specification.

This invention has for its object to provide an equalizing device adapted for attachment to trailer cars which will enable the driver of a truck to manipulate and control the operation of brakes upon one or more trailers simultaneously with his manipulation of the brakes of the truck and without additional movements. New laws becoming operative in the several States require that every trailer car be equipped with brakes that will effectually hold the car independently of the brakes upon the truck, and as there has been no means heretofore devised, so far as I am aware, which would enable the driver of the truck to control the brakes upon the trailers it has been necessary to place a man upon each trailer in order to control the brakes thereon, which has added greatly to the cost of transporting goods by means of motor trucks and trailers.

My present invention enables me to provide an equalizing device which will serve as a connecting means between the brakes of the truck and the brakes of a trailer, will permit any number of trailers within the power of the truck to be coupled thereto, will place the brakes of every trailer completely under the control of the driver of the truck, and will effectually compensate for changes in position of the chassis of the trailers relatively to each other and to the chassis of the truck, as on grades, whether the trailers are pushing or dragging, and on curves, and where the chassis are at different heights from the ground owing to differences in the weights of the loads.

With these and other objects in view I have devised the novel equalizing device which I will now describe referring to the accompanying drawing forming a part of this specification and using reference characters to indicate the several parts.

Figure 1 is a plan view showing the chassis frames, wheels and brakes of a truck and a trailer;

Fig. 2 a central longitudinal section corresponding substantially therewith;

Fig. 3 a perspective view on an enlarged scale of my novel equalizing device detached, and Fig. 4 is a view corresponding with Fig. 1 illustrating the operation of the equalizing device on a curve.

10 denotes the chassis frame of a truck, 11 the chassis frame of a trailer, 12 the truck brakes, and 13 the trailer brakes. The truck is provided with the usual rock shaft 14 from which an arm 15 extends, which is connected by means of a rod 16 with the brake lever 17. The rock shaft also has extending therefrom arms 18 which are connected by means of rods 19 with the truck brakes. The trailer is provided with a rock shaft 20 having arms 21 which are connected by means of rods 22 with the trailer brakes.

My novel equalizing device is carried by a bracket 23 which is rigidly bolted to the front end of the trailer chassis frame. The special configuration of this bracket is not of the essence of the invention, it being simply required that the bracket be provided with a plate 24 having a slot 25 lying longitudinally to the chassis of the trailer. 26 denotes the equalizing bar, one end of which is pivoted on a stud 27 which is adapted to slide in slot 25. The equalizing bar lies above plate 24, the stud extending through the slot and having pivoted on its lower end, that is under the plate, a swivel link 28. The opposite end of the equalizing bar is provided with a stud 29, on the lower end of which, under the bar, is pivoted a swivel link 30. 31 denotes the rear axle of the truck which is suspended from the chassis frame in parallel relation to the rear end thereof. 32 denotes the front axle of the trailer which is suspended from the chassis in parallel relation to the front end thereof. The rear axle of the truck is provided at one side of its midlength with a swivel link 33. Swivel link 30 on the equalizing bar, which is adapted to oscillate in the horizontal plane, is connected by means of a rod 34 with a swivel link 33 on the rear axle of the truck, which is adapted to oscillate in the vertical plane. Each end of rod 34 is provided with a yoke 35, said yokes being pivoted respectively to swivel links 30 and 33. The front axle of the trailer is provided at one side of its midlength with a swivel link 36. Swivel link 28 on the equalizing bar, which is adapted to oscillate in the horizontal plane, is connected by means of a rod 37 with swivel link 36 on the front axle of the trailer which is adapted to oscillate in the vertical plane. Each end of rod 37 is provided with a yoke 38, said yokes being pivoted respectively to swivel links 28 and 36. I have shown swivel links 33 and 36 as pivoted to the axles of truck and trailers, respectively. This is good construction but by no means essential, as it is obvious that, if preferred, said swivel links may be pivoted to any fixed and solid portions of the chassis frames.

39 and 40 denote bell crank levers which are pivoted respectively on studs 41 and 42 which are rigidly secured to and extend upward from opposite sides of the midlength of the equalizing bar. The contiguous arms of these bell crank levers are connected by means of a link 43 which is pivoted to each lever. Bell crank lever 39 is connected by means of a rod 44 to arm 15 extending from rock shaft 14 on the truck and bell crank lever 40 is connected by means of a rod 45 to an arm 46 extending from rock shaft 20 on the trailer. In order to insure perfect freedom of movement rods 44 and 45 are provided with yokes 47 which are pivoted to the outer arms of the bell crank levers.

The special type of coupling used between the truck and the trailer and between successive trailers is immaterial so far as the present invention is concerned. It is simply required that any well known form of resilient swinging coupling be used, such for example as is indicated as a whole by 48, the details of construction not being illustrated.

It will be noted that rods 34 and 37, which extend from the equalizing bar to the rear axle of the truck and to the front axle of the trailer respectively, are connected to the equalizing bar by universal joints which permit free movement of the bar relatively to the rods in both the vertical and horizontal planes. This compensates for variations in load between the truck and the trailer and also for the vertical movements of the chassis frames on rough roads or when a wheel passes into a rut. Additional compensation is required, owing to the flattening of the springs of trucks and trailers, not shown, under the weight of a load. This is effected by providing free movement of stud 27 in slot 25 in the bracket. As both ends of the equalizing bar are free to oscillate on studs, it will be noted that ample compensation is made for relative changes in position of the chassis frames on curves, and the tendency to push forward on down grades and to drag on up grades, that is to move toward and from each other.

Owing to the fact that the contiguous ends of the bell crank levers are connected by means of a pivoted link, it follows that operation of the brake lever on the truck in addition to setting the truck brakes, will through the differential movement of the bell crank levers, cause rod 45 to set the brakes of the trailer. As each trailer is completely equipped, it follows that the addition of a second trailer requires only the addition of a rod 44 extending from arm 46 on the rock shaft of the first trailer to the bell crank lever 39 of the second trailer, and a rod 34 extending from the rear axle of the first trailer to the equalizing bar of the second trailer, and so on, each additional trailer being connected to the proceeding trailer by a rod 44 and a rod 34. Operation of the brake lever, therefore, simultaneously sets the brakes upon the truck and all of the trailers.

Having thus described my invention, I claim:

1. An equalizing device for trailer brakes comprising a bracket having a slot, a stud adapted to slide in said slot, an equalizing bar pivoted on said stud, bell crank levers pivoted on said bar, and a link connecting the contiguous ends of said levers, the other arms of said levers being adapted for connection respectively to the brakes of a truck and the brakes of a trailer, and the ends of the equalizing bar being adapted for connection respectively to a truck chassis and a trailer chassis.

2. A device of the character described comprising an equalizing bar, a bracket adapted for attachment to a trailer to which said bar is pivotally and slidably connected, bell crank levers pivoted to said bar, a link connecting the contiguous arms of said levers, trailer brake and truck brake connections respectively from the other arms of said levers, and connections from the equalizing bar adapted to engage respectively a truck chassis and a trailer chassis.

3. A device of the character described comprising an equalizing bar, a bracket adapted for attachment to a trailer to which said bar is pivotally and slidably connected, swivel links at the ends of said bar, bell crank levers pivoted to said bar, a link connecting the contiguous ends of said levers, trailer brake and truck brake connections respectively from the other arms of said levers, and connections from the swivel links which are adapted to engage respectively the chassis of a truck and the chassis of a trailer.

4. A device of the character described comprising a slotted bracket adapted for attachment to a trailer, an equalizing bar, studs on which said bar is pivoted, one of which is adapted to slide in said slot, bell crank levers pivoted to said bar, a link connecting the contiguous arms of said levers, connections from the other arms of said levers adapted for connection respectively to truck brakes and trailer brakes, and connections having universal movement and adapted for attachment respectively to a truck chassis and a trailer chassis.

5. A device of the character described comprising an equalizing bar, a bracket adapted for attachment to a trailer to which said bar is pivotally and slidably connected, swivel links at the ends of said bar, bell crank levers pivoted to said bar, a pivoted connection intermediate the contiguous ends of said levers, connections pivoted to the other arms of said levers for truck brakes and trailer brakes respectively, and pivoted connections from the swivel links respectively for a truck chassis and a trailer chassis.

6. A device of the character described comprising an equalizing bar, a bracket adapted for attachment to a trailer, to which said bar is pivotally and slidably connected, bell crank levers pivoted to said bar, a link connecting the contiguous ends of said levers, trailer brake and truck brake connections respectively from the other arms of said levers, and universal connections from the ends of the equalizing bar for attachment respectively to the rear axle of a truck and the front axle of a trailer.

7. The combination with a truck chassis, a trailer chassis and an intermediate resilient swinging coupling, of a slotted bracket attached to the trailer, an equalizing bar pivotally and slidably connected to said bracket, bell crank levers pivoted to said bar, a link connecting the contiguous ends of said levers, truck brake and trailer brake connections respectively from the other arms of said levers, and universal connections from the ends of the equalizing bar to a truck chassis and a trailer chassis respectively.

8. The combination with a truck chassis, a trailer chassis and an intermediate resilient swinging coupling, of a slotted bracket attached to the trailer, an equalizing bar pivotally and slidably connected to said bracket, swivel links at the ends of said bar, bell crank levers pivoted to said bar, a link connecting the contiguous arms of said levers, truck brake and trailer brake connections respectively from the other arms of said levers, and connections from the swivel links to a truck chassis and a trailer chassis respectively.

9. The combination with a truck chassis, a trailer chassis and an intermediate resilient swinging coupling, of a slotted bracket attached to the trailer, an equalizing bar pivotally and slidably connected to said bracket, swivel links at the ends of said bar, bell crank levers pivoted to said bar, a pivoted connection intermediate the contiguous arms of said levers, truck brake and trailer brake connections respectively from the other arms of said levers, and connections from the swivel links to the rear axle of a truck and the front axle of a trailer respectively.

In testimony whereof I affix my signature.

EDWARD F. KELLEY.